Feb. 11, 1969 K. WILFERT 3,426,862

DRIVE AXLE FOR VEHICLES, ESPECIALLY MOTOR VEHICLES

Filed Dec. 1, 1966

INVENTOR
KARL WILFERT

BY *Dicke & Craig*
ATTORNEYS

United States Patent Office 3,426,862
Patented Feb. 11, 1969

3,426,862
DRIVE AXLE FOR VEHICLES, ESPECIALLY MOTOR VEHICLES
Karl Wilfert, Gerlingen-Waldstadt, Germany, assignor to Daimler-Benz Aktiengesellschaft, Stuttgart-Unterturkheim, Germany
Filed Dec. 1, 1966, Ser. No. 598,482
Claims priority, application Germany, Dec. 2, 1965, D 48,800
U.S. Cl. 180—73            21 Claims
Int. Cl. B60k 17/00; B60g 11/06

ABSTRACT OF THE DISCLOSURE

A drive axle for vehicles, especially motor vehicles, in which the wheels are driven from an axle gear by way of pivoted or jointed driving half-shafts, and in which each wheel is guided in the vehicle transverse direction by transverse guide members; additionally, each wheel is guided in the longitudinal direction by means of a longitudinal guide link, and the two longitudinal guide links are so connected by means of a common support that they can pivot about a transverse vehicle axis independently of one another and that they pivot in unison about a longitudinal vehicle axis, whereby the axle support is suspended from the vehicle body or frame independently of the axle gear.

Background of the invention

The present invention relates to a drive axle for vehicles, especially motor vehicles, whereby the two wheels of this axle driven from an axle gear by way of a respective jointed half-shaft are suspended at longitudinal links which, by means of a support member, are adapted to pivot in a universal joint-like manner in relation to the vehicle body both about a cross axis of the vehicle as also in unison about a longitudinal axis.

With a known rigid axle of the aforementioned type, the axle gear is adapted to pivot in unison or together with the support member about a vehicle longitudinal axis. This results in large unsprung masses and becomes effective disadvantageously on the spring comfort of the vehicle. Furthermore, as view in plan view, disadvantageous changes in length at the longitudinal links result thereby which have as a consequence automatic steering effects, distortions and stresses and a high wear. A further disadvantage of the prior art suspension essentially consists in that with one-sided or unilateral shocks on a wheel, changes in track as well as changes in camber are the consequence.

Summary of invention

The present invention now aims at avoiding the aforementioned disadvantages and therewith to achieve a considerable improvement of the known axle so that the axle can satisfy the present-day high requirements as regards roadability and spring comfort of a vehicle. As solution to the underlying problem, it is proposed in accordance with the present invention that the two longitudinal links are pivotal independently of one another about the cross axis and are constructed in the manner of torsion springs, and in that the wheels of the axle are guided essentially parallelly in the vehicle transverse direction and that the axle gear is suspended at the vehicle body or frame independently of or separate from the support piece. This suspension may take place either rigidly or elastically, for example, by way of conventional rubber cushions.

As a result of the construction according to the preceding inventive concepts, a considerable improvement in the maintenance of the track of the wheels is achieved with a minimum of masses to be moved. For example, with wheel movements in opposite directions as a result of a unilateral obstacle, the changes in length at the longitudinal guide links—as viewed in plan view—are kept practically negligibly small by the pivoting of the support member about the vehicle longitudinal axis because the point of pivotal connection of the longitudinal link deflected by the obstacle moves along in the direction of the wheel movement. As a result of the aforementioned reduced changes in length at the longitudinal guide links as described above, distortions, automatic steering deflections, strong material wear and the like are simultaneously reduced to a minimum in an advantageous manner.

Though the support member pivots about the vehicle longitudinal axis with such wheel movements in opposite directions, advantageously this need not be connected with changes in camber at the wheels because the latter are guided in the transverse direction essentially parallelly according to the present invention. Exclusively the longitudinal guide links are twisted in themselves which, for this purpose, are constructed in the manner of a torsion spring. In particular, the present invention prefers for that reason a construction whereby the torsion-spring longitudinal guide links are constructed in the manner of flat bands and are supported respectively at one end thereof in a tubularly shaped housing part of the bearer or support member arranged in the transverse direction. This construction of the longitudinal guide links assures, on the one hand, a good twistability thereof and, on the other, in particular with the preferred on-edge, upright arrangement thereof, a high rigidity in the vertical direction.

In order to enable the pivotability of the support member and of the entire axle about a longitudinal axis, the present invention proposes in connection therewith that another tubularly shaped housing part arranged in the longitudinal direction extends through the tubularly shaped housing part of the support member arranged in the transverse direction in a crosslike manner whereby the housing part arranged in the longitudinal direction is rotatably arranged at the vehicle body or frame about its longitudinal axis. Such a cross-shaped tubular housing exhibits with comparatively small dimensions and a corresponding slight spatial requirement, excellent rigidity properties.

The transverse support and kinematic guidance of the wheels may be realized, in principle, in any desired, known manner and may be adapted in each case to the prevailing conditions and requirements. Appropriate thereby is the utilization of known and proven structural parts. Within this meaning, the present invention proposes that for purposes of transverse support and kinematic guidance of the wheels, superposed pivoted guide members or guide links and/or leaf springs and/or coupling rods with ball heads or elastic eyes may be utilized.

For the construction of the wheel carrier which, in principle, may of course be of any desired construction, the present invention prefers a solution according to which each wheel carrier is constructed as a plate-shaped part with a centrally disposed funnel-shaped portion serving for the passage of the jointed drive shaft, whereby the longitudinal guide link is secured at a respective plate-like part. It is thereby also feasible that the longitudinal link forms itself the plate-shaped part of the wheel carrier. Furthermore, it is proposed in accordance with the present invention that the plate-like parts are bent over toward the vehicle center on the sides thereof opposite the longitudinal links and that transverse guide members engage at these bent-over parts.

A particularly simple drive axle is attained if, according to a further development and feature of the inventive concept, only one transverse guide member engages above and one below the jointed drive shaft at the bent-over part of each wheel carrier whereby both guide members are pivotally connected, on the other hand, in corresponding eyes of the axle gear housing. With such a construction, the longitudinal guide linkes are utilized to a certain extent also for the purpose of the transverse guidance. Insofar as one desires to relieve the latter from this task and one seeks to further improve the cross guidance, it is, of course, also possible to arrange at each wheel carrier in front of the drive shafts still further cross guide links or members in the same manner and of the same type as are secured at the bent-over part to the rear of the drive shaft.

Accordingly, it is an object of the present invention to provide a drive axle for vehicles, especially motor vehicles, which obviates by extremely simple and effective means the aforementioned shortcomings and drawbacks encountered with the prior art constructions.

It is another object of the present invention to provide a drive axle for vehicles, especially motor vehicles, which substantially reduces the unsprung mass of the vehicle, increases the driving comfort of the vehicle as regards its spring system and roadability and avoids undesirable automatic steering effects, stresses and distortions as well as high wear in the parts thereof.

A still further object of the present invention resides in a driving axle and wheel suspension for motor vehicles which minimizes changes in the track and camber of the wheels.

Still another object of the present invention resides in an axle gear and suspension thereof for motor vehicles in which the supporting parts exhibit high rigidity notwithstanding small spatial requirements.

These and other objects, features and advantages of the present invention will become more obvious from the following description when taken in connection with the accompanying drawing which shows, for purposes of illustration only, one embodiment in accordance with the present invention, and wherein.

Figure 1:
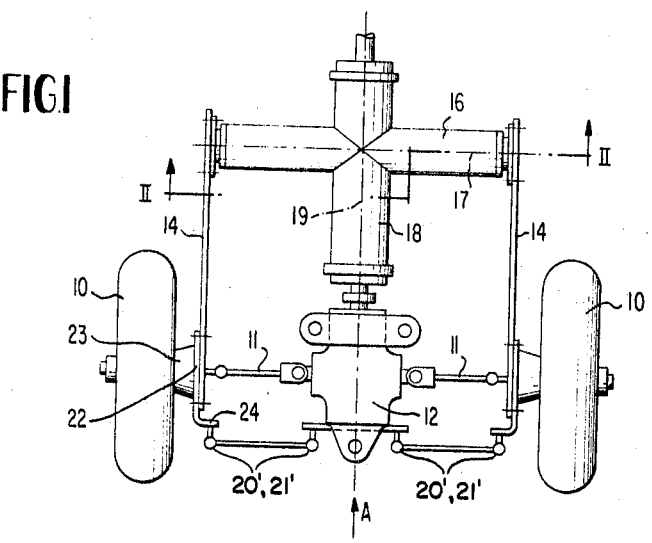
FIGURE 1 is a top plan view of a drive axle in accordance with the present invention.
Figure 2:
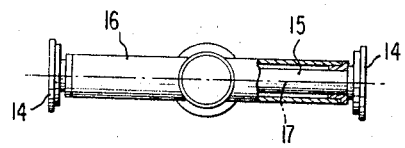
FIGURE 2 is a transverse cross-sectional view, taken along line II—II of FIGURE 1.
Figure 3:
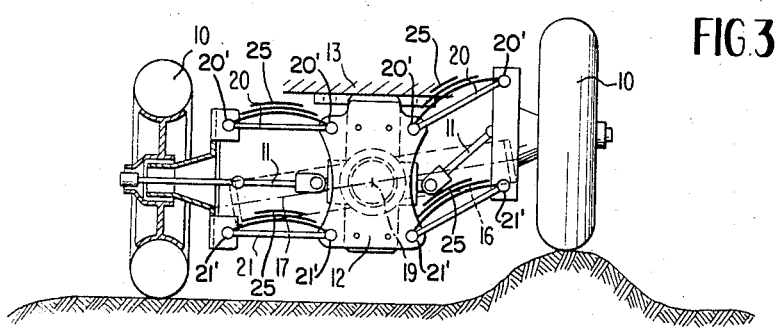
FIGURE 3 is a rear elevational view, partly in cross section, and taken in the direction of arrow A of FIGURE 1.

Referring now to the drawing wherein like reference numerals are used throughout the various views to designate like parts, and more particularly to FIGURES 1 and 2, the wheels 10 of the axle are driven each by a respective pivoted half-axle drive shaft 11 which are driven from and start at an axle gear 12. The housing of the axle gear 12 is secured either rigidly or elastically, for example, by means of conventional rubber cushions or in a similar manner at the vehicle body or frame 13 (FIG. 3). Consequently, the housing of the axle gear 12 no longer belongs to the unsprung mass of the drive axle. The spring characteristics of the latter are thereby greatly improved.

The wheels 10 are secured by means of the wheel carriers 22 thereof at one end of a respectively longitudinal guide link 14. With the other end thereof, the longitudinal links 14 are supported by means of pins 15 (FIG. 2) in a transversely disposed tubularly shaped housing part 16—rotatable about the axis 17 thereof. The housing part 16 is rigidly connected in a cross-like manner with another tubularly shaped housing part 18. The latter is arranged in the longitudinal direction and is pivotal about the vehicle longitudinal axis. Both tubular parts 16 and 18 together form a tubular cross with comparatively high rigidity and small dimensions. They thus form the support member of the drive axle. This support member 16, 18 is, as already described, rotatable about the longitudinal axis 19 and about a cross axis 17 of the vehicle so that the wheels 10 are now suspended in a universal joint-like manner.

The arrangement is thereby made in such a manner that the movements of the longitudinal links 14 about the vehicle longitudinal axis take place always in unison, i.e., if the point of pivotal connection of one longitudinal guide link 14 moves upwardly then the point of pivotal connection of the other longitudinal guide link 14 will move downwardly. In contradistinction thereto, the movement of the longitudinal links 14 about the vehicle cross axis 17 is independent of one another. The longitudinal links 14 are constructed in the manner of torsion rod springs. They form thereby a flat rod which is placed upright, on-edge. The support piece formed by the tubular cross 16, 18, is separate from the housing of the axle gear 12. The suspension of the tubular cross 16, 18 may take place in any conventional manner, for example, elastically and is therefore not illustrated in detail herein. It serves appropriately also for the passage of the cardan shaft of the vehicle.

The wheel carriers 22 are constructed in a plate-shaped manner and possess an approximately centrally disposed funnel portion 23 for the passage of the driving half-shafts 11. The longitudinal guide links 14 are secured at the plate-shaped funnel portions 23. On the side opposite the longitudinal links 14, the plate-shaped parts 22 are bent over toward the inside of the vehicle to form inwardly directed web portions 24. The elements for the cross guidance of the axle engage at this inwardly directed web portion 24—which, as viewed in the driving direction, is disposed to the rear of the driving half-shafts 11. Guide links 20 above the driving half-shaft 11 and further guide links 21 below the driving half-shaft 11 are provided as the cross guide members, as can be readily seen from FIGURE 3. Both guide members 20 and 21 may include leaf springs 25 and may be secured by means of ball joints or corresponding rubber parts at the web portion 24, on the one hand, and at the housing of the axle gear 12, on the other. Since such ball joints and corresponding rubber parts are of known, conventional construction, they are only shown schematically and designated by reference numerals 20' and 21'.

As can be seen from FIGURE 3, with a one-sided spring deflection of the right wheel 10, the support member 16, 18 also assumes a corresponding inclined position. The deflection of the support piece 16, 18 takes place by about half the angle which subtend the guide members 20 and 21 on the righthand side. In this manner, only a practically insignificant change in length occurs at the longitudinal links 14.

While I have shown and described one embodiment in accordance with the present invention, it is understood that the same is not limited thereto but is susceptible of numerous changes and modifications as known to a person skilled in the art, and I therefore do not wish to be limited to the details shown and described herein.

I claim:

1. A drive axle for a vehicle, especially for a motor vehicle, in which the wheels of the axle, driven from an axle gear means by way of drive shaft means are suspended from the vehicle by longitudinal link means, wherein the improvement compdises support means for supporting said longitudinal link means on the vehicle so as to enable pivotal movement of said longitudinal link means about a transverse axis independently of one another and in unison about a longitudinal axis, transverse guide means for guiding the wheels of said axle substantially parallel to one another in the vehicle transverse direction, and said axle gear means being suspended at the vehicle separately from said support means.

2. An axle according to claim 1, wherein said longitudinal link means are constructed in the manner of torsion springs.

3. An axle according to claim 2, wherein said torsion spring longitudinal link means are constructed in the manner of flat bands, said support means including a first tubularly shaped housing part arranged in the transverse direction of the vehicle, and said longitudinal link means being supported at one end thereof in said one housing part.

4. An axle according to claim 3, wherein said support means includes a second tubularly shaped housing part disposed in the vehicle longitudinal direction and extending through the first housing part in a cross-like manner.

5. An axle arrangement according to claim 4, wherein said transverse guide means serving for the cross support and kinematic guidance of the wheels include superposed link members.

6. An axle arrangement according to claim 4, wherein said transverse guide means serving for the cross support and kinematic guidance of the wheels include superposed leaf spring means.

7. An axle arrangement according to claim 4, wherein said transverse guide means serving for the cross support and kinematic guidance of the wheels include superposed coupling rod means.

8. An axle arrangement according to claim 4, wherein said transverse guide means serving for the cross support and kinematic guidance of the wheels include superposed link means, leaf spring means, and coupling rod means.

9. An axle arrangement according to claim 8, wherein at least some of said transverse guide means include ball-head means.

10. An axle arrangement according to claim 8, wherein at least some of said transverse guide means include elastic eye means.

11. An axle according to claim 4, further comprising wheel carrier means for each wheel constructed as a plate-like part having an approximately centrally disposed funnel portion for the passage of the drive shaft means, the longitudinal link means being secured at the plate-like part.

12. An axle according to claim 11, wherein the plate-like parts are bent-over toward the vehicle center on the side thereof opposite the longitudinal link means, the transverse guide means engaging at a respective bent-over part.

13. An axle according to claim 12, wherein said transverse guide means includes two transverse guide members, and only one guide member disposed above the respective drive shaft means and only one guide member disposed below the respective drive shaft means being operatively connected at the corresponding bent-over part, the last-mentioned guide members being pivotally connected, on the other side, at the housing of the axle gear means.

14. An axle according to claim 1, wherein said support means include a first tubularly shaped housing part arranged in the transverse direction of the vehicle, and said longitudinal link means being supported at one end thereof in said one housing part.

15. An axle according to claim 14, wherein said support means includes a second tubularly shaped housing part disposed in the vehicle longitudinal direction and extending through the first housing part in a crosslike manner.

16. An axle according to claim 15, further comprising wheel carrier means for each wheel constructed as a plate-like part having an approximately centrally disposed funnel portion for the passage of the drive shaft means, the longitudinal link means being secured at the plate-like part.

17. An axle according to claim 16, wherein the plate-like parts are bent-over toward the vehicle center on the side thereof opposite the longitudinal link means, the transverse guide means engaging at a respective bent-over part.

18. An axle according to claim 17, wherein said transverse guide means includes two transverse guide members, and only one guide member disposed above the respective drive shaft means and only one guide member disposed below the respective drive shaft means being operatively connected at the corresponding bent-over part, the last-mentioned guide members being pivotally connected, on the other side, at the housing of the axle gear means.

19. An axle according to claim 1, further comprising wheel carrier means for each wheel constructed as a plate-like part having an approximately centrally disposed funnel portion for the passage of the drive shaft means, the longitudinal link means being secured at the plate-like part.

20. An axle according to claim 19, wherein the plate-like parts are bent-over toward the vehicle center on the side thereof opposite the longitudinal link means, the transverse guide means engaging at a respective bent-over part.

21. An axle according to claim 20, wherein said transverse guide means includes two transverse guide members, and only one guide member disposed above the respective drive shaft means and only one guide member disposed below the respective drive shaft means being operatively connected at the corresponding bent-over part, the last-mentioned guide members being pivotally connected, on the other side, at the housing of the axle gear means.

References Cited

UNITED STATES PATENTS

| | | | |
|---|---|---|---|
| 2,132,963 | 10/1938 | Nallinger | 180—73 X |
| 2,177,893 | 10/1939 | Krotz | 180—73 |
| 2,330,541 | 9/1943 | Barneyi | 180—73 |

A. HARRY LEVY, *Primary Examiner.*

U.S. Cl. X.R.

280—124